March 2, 1965     C. J. DE CARO ETAL     3,171,131
TOOL
Original Filed June 8, 1956     10 Sheets-Sheet 1

Inventors
Charles J. De Caro
Robert W. Henning
Herbert L. Ivins
BY Donald R. Motsko
Attorney

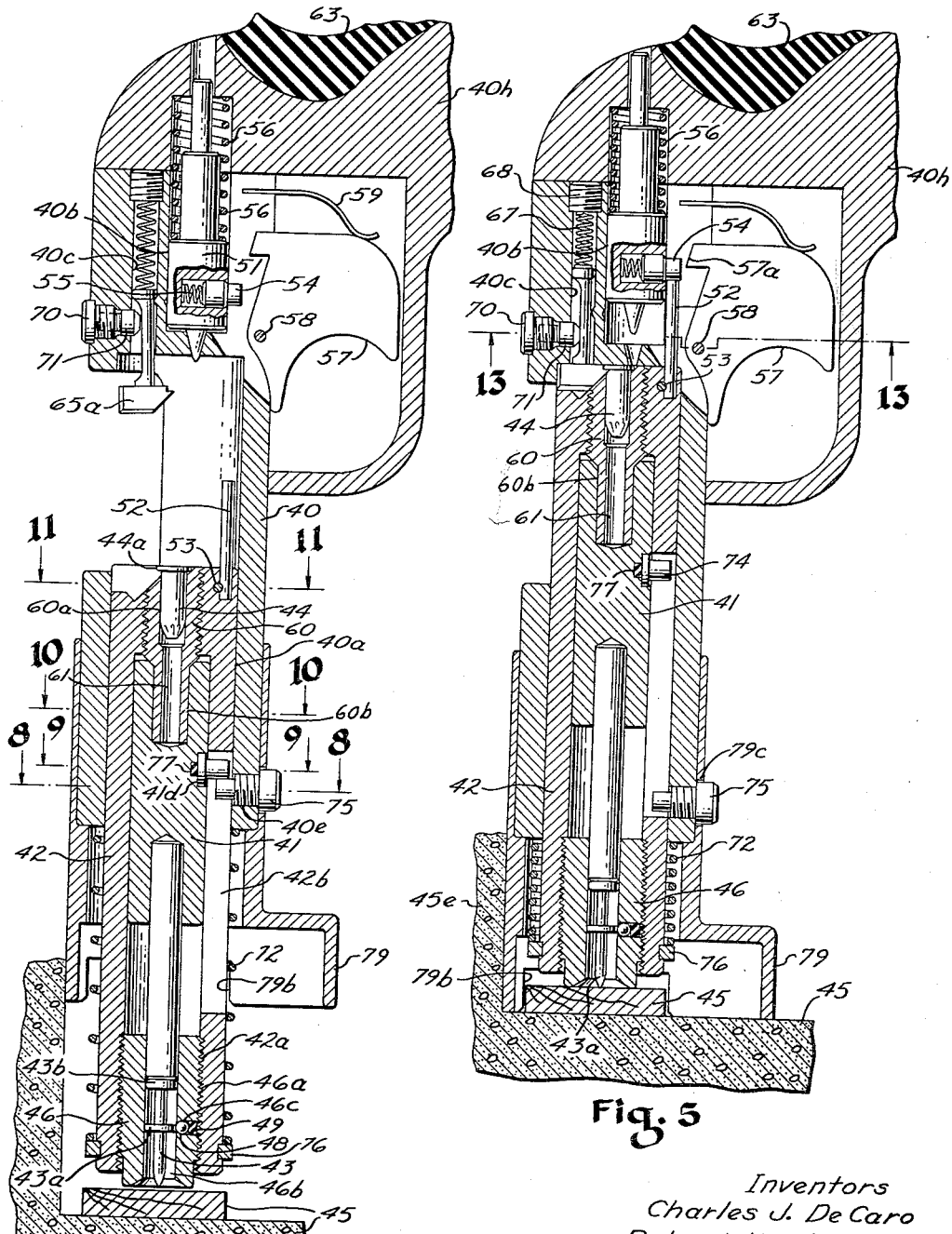

Inventors
Charles J. De Caro
Robert W. Henning
Herbert L. Ivins

Attorney

Inventors
Charles J. De Caro
Robert W. Henning
Herbert L. Ivins
BY Donald R. Motsko
Attorney Inventors
Charles J. De Caro
Robert W. Henning
Herbert L. Ivins
BY
Attorney

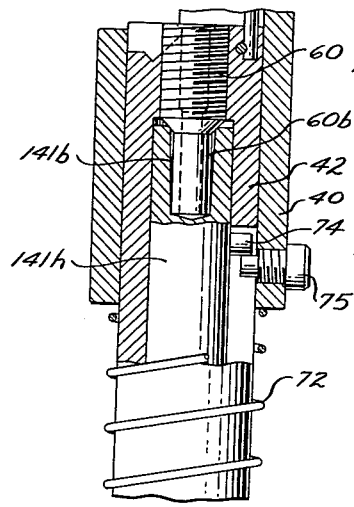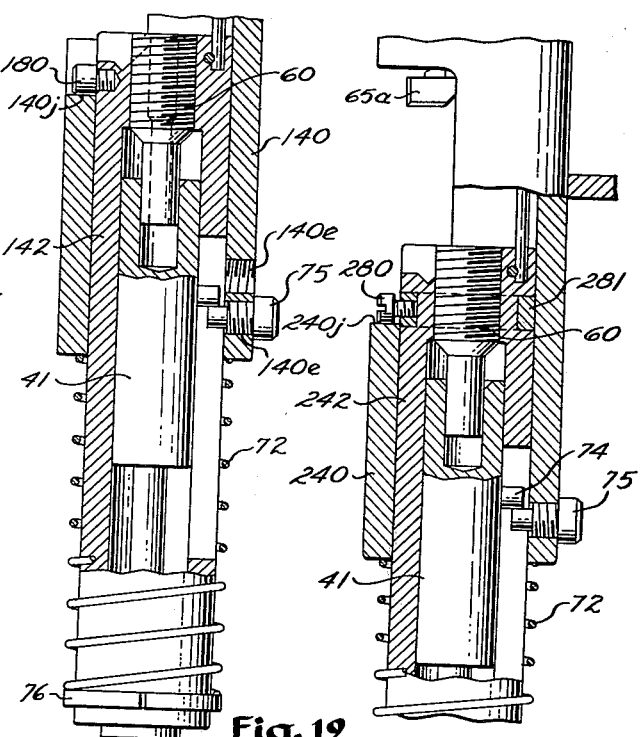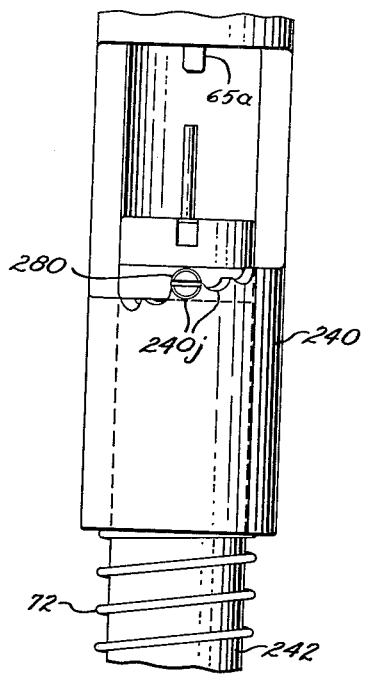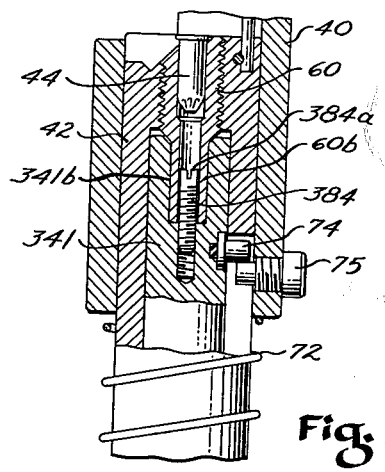

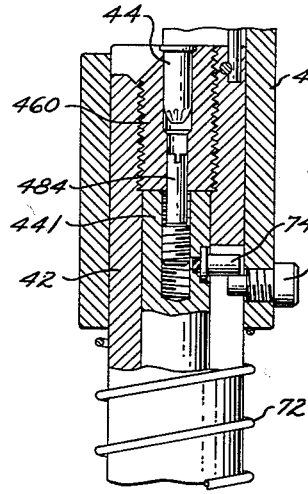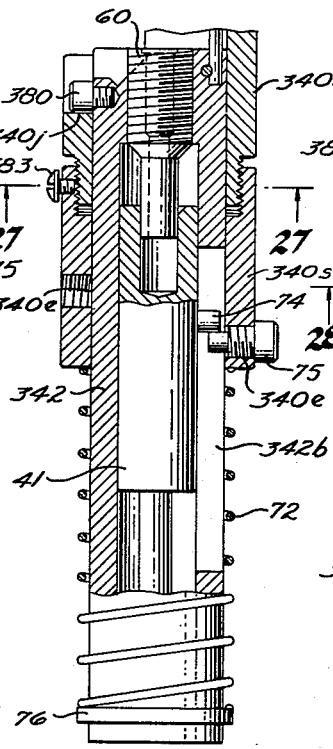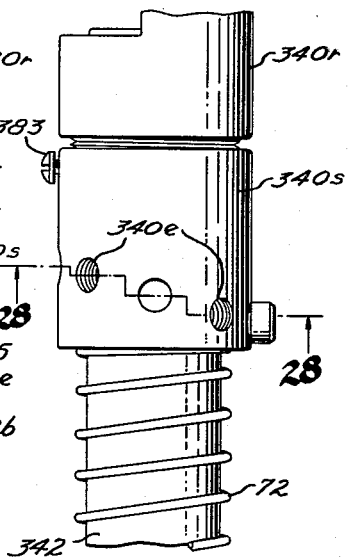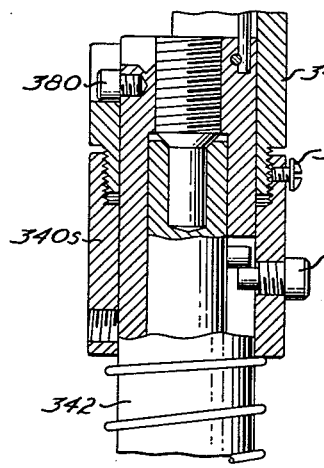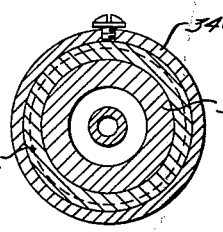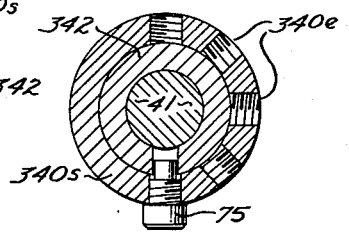

Inventors
Charles J. De Caro
Robert W. Henning
Herbert L. Ivins
BY Donald R. ...
Attorney

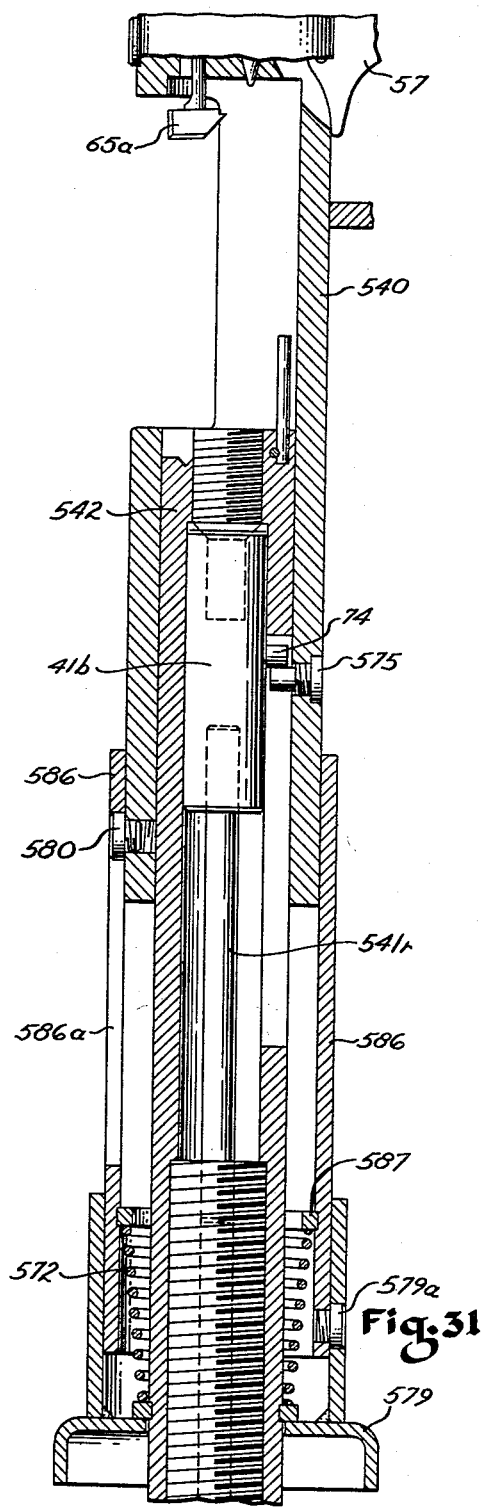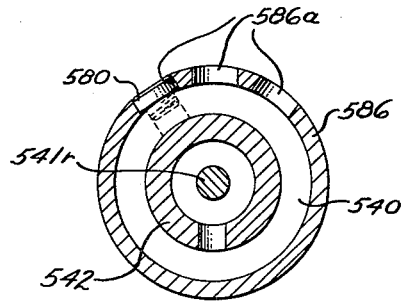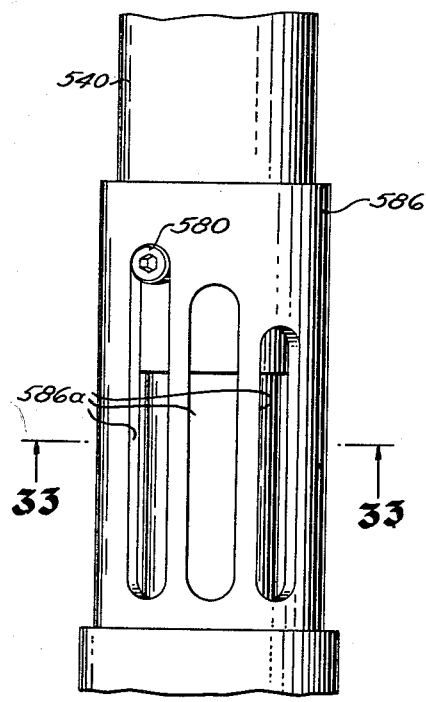

Inventors
Charles J. DeCaro
Robert W. Henning
Herbert L. Ivins
BY
Donald R. Martin
Attorney

United States Patent Office

3,171,131
Patented Mar. 2, 1965

3,171,131
TOOL
Charles J. De Caro, Cleveland, Robert W. Henning, Rocky River, and Herbert L. Ivins, Cleveland, Ohio, assignors to Ramset Fasteners, Inc., a corporation of Delaware
Original application June 8, 1956, Ser. No. 590,274, now Patent No. 3,066,302, dated Dec. 4, 1962. Divided and this application Sept. 26, 1962, Ser. No. 245,336
5 Claims. (Cl. 1—44.5)

This invention relates to improvements in a tool and more particularly to a fastener driving, punching or carpet strip attaching tool. This application is a division of our Serial No. 590,274, filed June 8, 1956, and now U.S. Patent No. 3,066,302, issued December 4, 1962.

One of the objects of the present invention is to provide a ram driving tool with means for automatically returning the ram from the final or driven position back to the initial position upon withdrawal of the tool from the workpiece.

A further object of the present invention is to provide a tool with a driving ram and means for returning the ram from its final position back to its initial position and for establishing a predetermined fluid pressure chamber size to control the ram driving force.

A further object of the present invention is to provide a tool as set forth in the immediately preceding paragraph with means for adjusting this chamber size to control the driving force on the arm.

A further object of the present invention is to provide a tool having an adjustable screw plug in the fluid pressure chamber to control the initial size of the chamber.

A further object of the present invention is to provide a powder actuated tool having its initial gas chamber designed for minimum volume, confined powder burning and/or power adjustment.

A further object of the present invention is to provide a powder actuated tool having a cartridge case extractor operatively mounted for lateral movement to slide over a cartridge case head shoulder, for blocking lateral blow-out in the breech closed position, and/or for resisting lateral movement during tool movement toward the breech open position so that the extractor will properly extract the cartridge case.

A further object of the present invention is to provide a power actuated tool with a driving ram and a ram stop sleeve with said sleeve having a ram abutment surface and attached to the remainder of the tool by threads extending axially up to the plane of the abutment surface to reduce breakage thereof.

A further object of the present invention is to provide a fastener driving tool having a driving ram and having fastener retaining means for supporting the fastener against fall-out before driving and being free of the fastener after driving so that the tool can be easily pulled off the driven fastener.

A further object of the present invention is to provide a tool for driving a fastener by a driving ram and including a rubber-like sleeve for resiliently holding a fastener against fall-out and/or serving as a buffer stop for the ram.

A further object of the present invention is to provide a tool for driving a fastener by a traveling ram and having a resiliently loaded ball to provide a fastener retaining means to hold the fastener against fall-out.

A further object of the present invention is to provide a power actuated driving tool having a laterally extending hand grip with rubber-like material thereon to absorb tool recoil.

A further object of the present invention is to provide a fastener driving tool having a shield especially adapted for securing a carpet attaching strip to a floor adjacent a wall.

A further object of the present invention is to provide a tool easily convertible from a fastener driving tool to a punching tool.

A further object of the present invention is to provide a tool having a driving ram including a rod and driving head separate in construction to minimize breakage.

A further object of the present invention is to provide a tool ram, as set forth in the previous paragraph, with the connection of this separate construction formed by either a threaded connection or the telescopic fit within a bore in the head of a rod having a smooth periphery.

A further object of the present invention is to provide a tool with a ram guide member having a slot providing a multiplicity of desirable tool functions.

A further object of the present invention is to provide a tool having a driving ram and relatively movable members with the movement of said members adapted to extract a spent cartridge case from the tool if the tool is powder actuated, for returning the ram from its final driven position back to its initial position, for activating a power means for tool driving or cocking its firing pin, and/or for establishing a predetermined but adjustable gas chamber size if the tool is powder actuated.

A further object of the present invention is to provide a tool characterized by its structural simplicity, ease of assembly, ease of operation, and its many desirable operating features.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

FIG. 4 is a longitudinal sectional view of the tool in the breech open position withdrawn from the workpiece;

FIG. 5 is a longitudinal sectional view of the tool in driving position with breech closed, firing pin cocked, and driving ram located in its initial position;

FIG. 18 is a longitudinal sectional view of the breech portion of the tool shown in FIG. 4 but with a modified form of ram bore forming the gas chamber;

FIG. 19 is a longitudinal sectional view of another form of the invention wherein the ram return abutment carried by the housing member may be mounted in either of two holes therein for adjusting the initial chamber volume size;

FIG. 20 is a longitudinal sectional view of another form of the invention wherein an adjustment ring is mounted on the guide member for coaction with the housing member to adjust the initial chamber volume size;

FIG. 21 is a side elevational view of the construction shown in FIG. 20;

FIG. 22 is a longitudinal sectional view of another form of the invention wherein an adjustable screw plug is mounted in the ram for adjusting the initial chamber size;

FIG. 23 is a longitudinal sectional view disclosing a slight modification of the FIG. 22 construction;

FIG. 24 is a longitudinal sectional view of another form of the invention wherein the tool housing member is formed of two axially adjustable parts for providing adjustment of the initial chamber volume size as well as ram return;

FIG. 25 is a side elevational view of the construction shown in FIG. 24;

FIG. 26 is a longitudinal sectional view of the construction shown in FIG. 24 with the abutment carried by the housing member located in a different hole thereon;

FIG. 27 is a transverse sectional view taken along the line 27—27 of FIG. 24;

FIG. 28 is a staggered, transverse sectional view taken along the line 28—28 of FIG. 25;

FIG. 31 is a longitudinal sectional view of the tool in FIG. 29 with the tool shown in its breech open and withdrawn position and the ram returned to its initial position;

FIG. 32 is a side elevational view of the pump action sleeve in FIG. 31;

FIG. 33 is a transverse sectional view taken along the line 33—33 of FIG. 32;

FIG. 34 is a longitudinal sectional view of a tool providing another form of the invention and including some of the features illustrated heretofore in different forms of the invention; while FIG. 35 is a longitudinal sectional view of the tool in FIG. 34 being used for punching instead of fastener driving.

Figure 1:
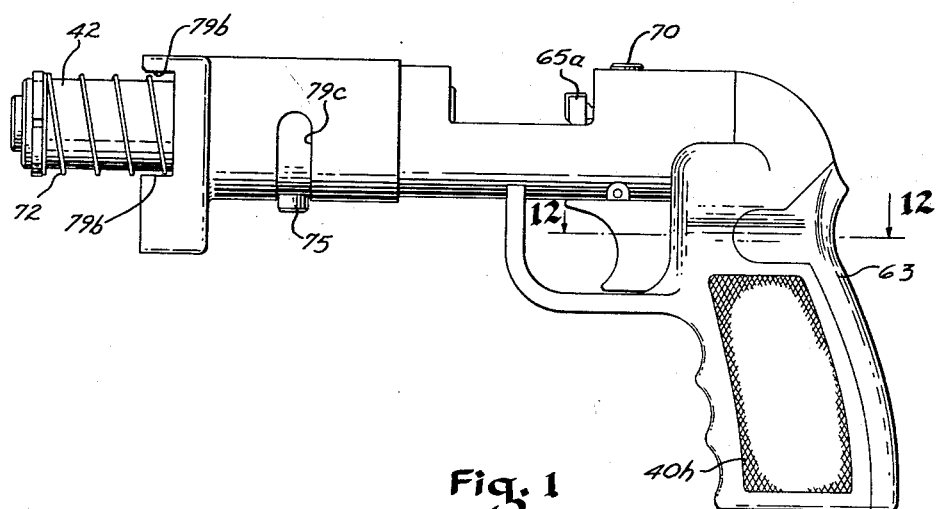
FIG. 1 is a side elevational view of the tool forming one form of the invention with the tool in the breech open position withdrawn from the workpiece.
Figure 2:
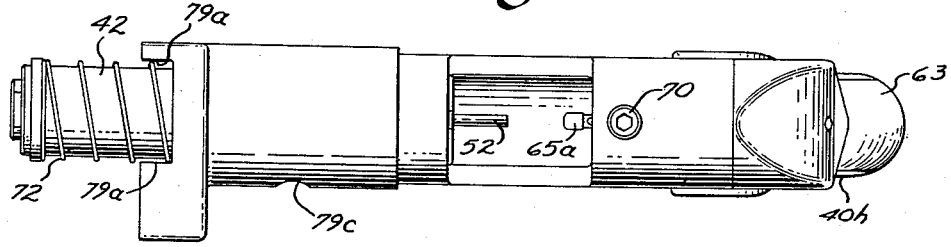
FIG. 2 is a top plan view of the tool in FIG. 1.
Figure 3:
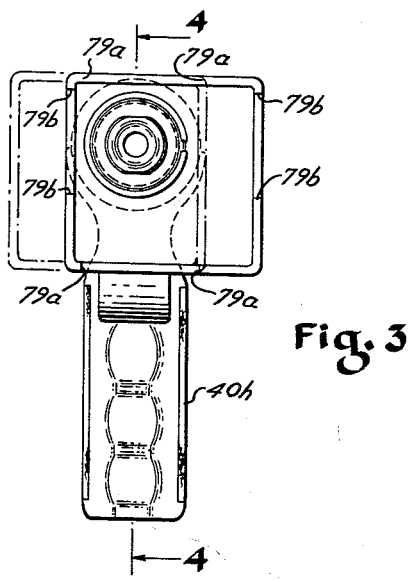
FIG. 3 is a side elevational view of the tool in FIG. 1 looking at the left end or muzzle thereof toward the right.

Before the tool here illustrated is specifically described, it is to be understood that the invention here involved is not limited to the structural details or arrangement of parts here shown since tools embodying the present invention may take various forms. It also is to be understood that the phraseology or terminology herein employed is for purposes of description and not of limitation since the scope of the present invention is denoted by the appended claims.

Those familiar with this art will recognize that the present invention may be applied in many ways, but it has been chosen to illustrate the same as a powder actuated tool. However, one or more of the aspects of the present invention may be used in a power actuated, powder actuated, fluid pressure actuated, etc., tool for driving fasteners, for punching, etc.

The first form of the invention in FIGS. 1 to 13 inclusive will be described first in detail. However, since all forms of the invention have the same basic parts and the same general mode of operation, a general description of those for FIGS. 1 to 13 inclusive should serve for all forms of the invention. The basic parts of the tool include a housing member 40 formed of two interconnected parts, a driving ram 41, a sleeve-type ram guide member 42 for guiding ram travel relative thereto between initial and final positions, and means operatively connecting members 40 and 42 for axial relative movement with said means including housing bore 40a telescoped over member 42. The basic function of the tool is to drive its ram by exploding the powder in cartridge case 44 for either driving fastener 43 into workpiece 45 or for punching a hole in a workpiece.

Figures 29, 30:
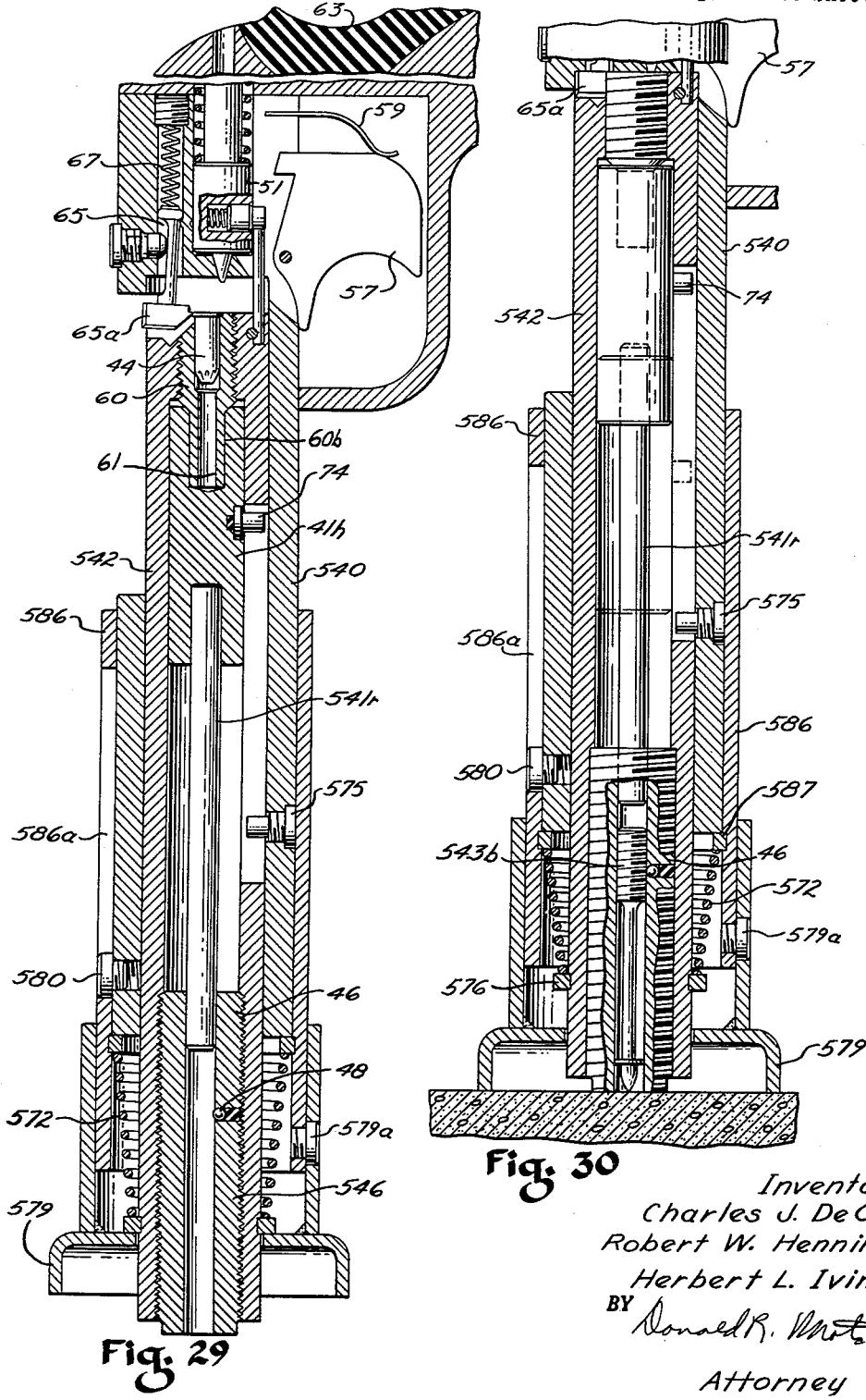
FIG. 29 is a longitudinal sectional view of another form of the invention wherein an outside sleeve is actuatable by pump action to return the ram to its initial position but with the sleeve shown in this view as having moved the tool nearly to the breech closed position.
FIG. 30 is a longitudinal sectional view of the tool in FIG. 29 in the breech closed and driving position with the ram in its initial position.
Figures 34, 35:
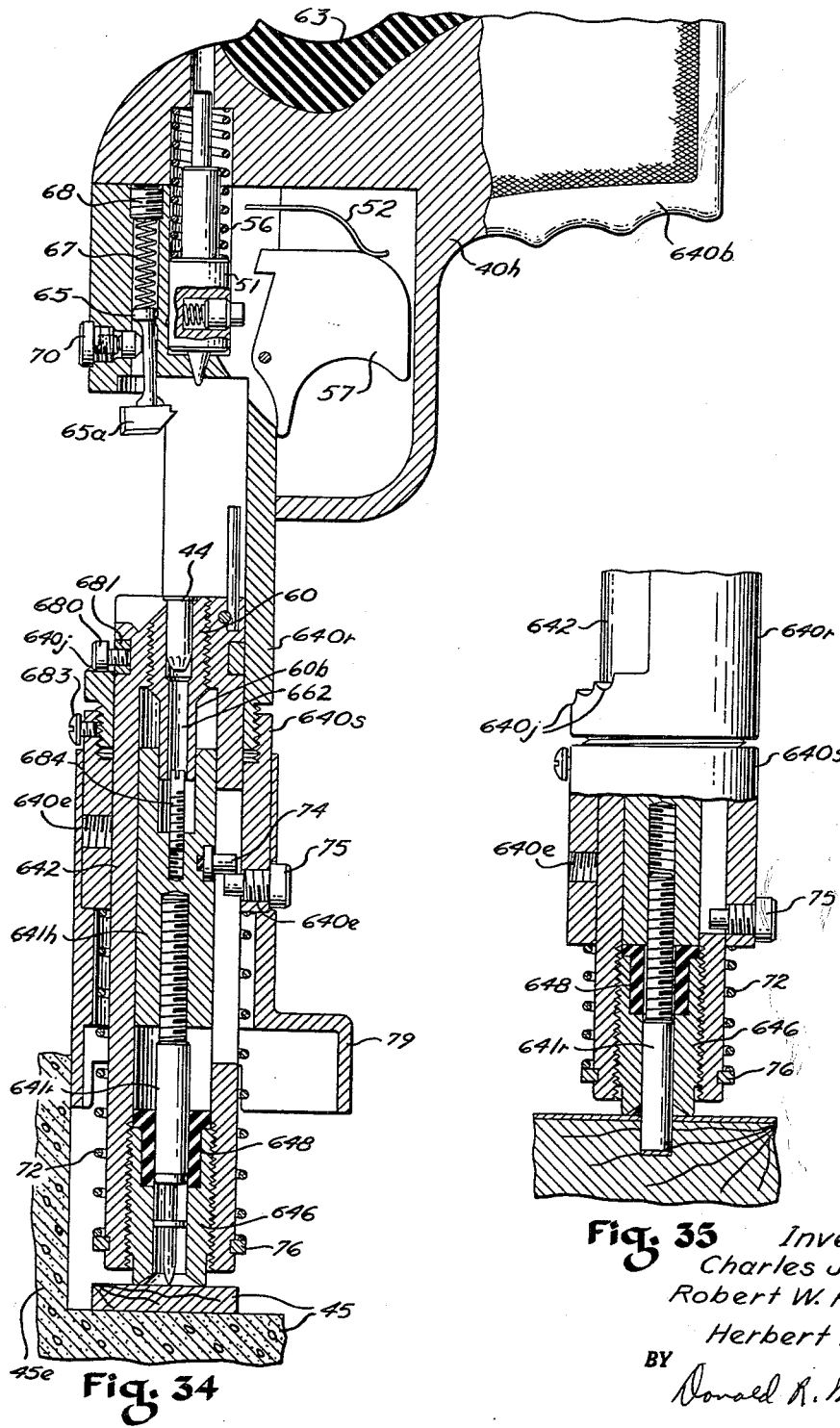

In the general mode of operation, the tool is first free of workpiece 45 with the component parts in the position shown in FIG. 4; this is the tool withdrawn and breech open position. The tool is moved downwardly in FIG. 4 toward the workpiece 45 until contact is made and then the housing member 40 continues its downward movement until the breech closed and tool driving position of FIG. 5 is reached with the tool against the workpiece. This movement has cocked the firing pin, as shown in FIG. 5. With the ram in its initial position of FIG. 5, the trigger is pulled to release the firing pin so that ram 41 is driven by the exploding powder in cartridge case 44 from the initial position in FIG. 5 to the final position in FIG. 6 with the fastener 43 fully driven. The tool then is pulled upwardly off the workpiece 45 by movement in the opposite direction back to the withdrawn and the breech open position. The relative movement of the members in the opposite direction extracts the cartridge case 44 and returns the ram 41 back to its initial position. Other figures of the drawings illustrate the other modifications in comparable positions. FIGS. 14, 16, 17, 29 and 30 show the ram in its initial positions; FIGS. 15 and 35 show the ram in its final positions; FIGS. 18, 19, 20, 21, 22, 23, 24, 25, 26, 31 and 34 show the ram in its initial position with the tool in its breach position; and FIGS. 30 shows the tool in its breech closed position.

Since a general introduction to all forms of the invention has been given, the form in FIGS. 1 to 13 inclusive will now be described in detail.

Means is provided on the guide member 42 for retaining fastener 43 in position for driving by ram 41 in its initial position. Here, a ram abutment sleeve 46 is secured in any suitable manner in the bore of guide member 42, here shown, as secured by screw threads 46a to guide member screw threads 42a. Bore 46b of this sleeve is adapted to telescopically receive the forwardly projecting rod of ram 41 and the fastener 43. The fastener retaining means is provided in bore 46b for supportnig fastener 43 against fall-out when the tool is in the vertical position of FIG. 4 for driving by the ram before it has been lowered against the workpiece. Here the fastener retaining means includes a recess 46c outwardly extending from bore 46b; a ball 48 in the recess; and suitable resilient means, such as rubber plug 49 biasing ball 48 inwardly to fastener engaging position. Retention is provided by having ball 48 engage with flange 43a of the fastener but the ball may be adapted to coact with fastener head 43b as shown by head 543b in FIG. 30, or any other suitable portion thereon. This ball may hold the fastener against the ram or spaced therefrom (compare FIGS. 5 and 30) with the spacing being dependent on the fastener length. Basically the same construction is also shown in FIGS. 14, 15, 16, 29 and 30 directed to other forms of the invention.

Although each form of the present invention (such as FIG. 4) is shown with the fastener 43 loaded into the tool before it is pressed against the workpiece 45, the tool will work equally well if the fasteners are partially driven into the workpiece 45 so that driving may be completed by telescoping the tool over the partially driven fastener and finishing the driving therewith.

The tool includes power means for driving the ram from initial to final positions with this power means activated in response to tool movement to the breech closed position. In the present disclosure, this power means takes the form of powder containing cartridge case 44 and a firing pin assembly for igniting this powder by striking the primer in said case. Here, firing pin 51 in FIG. 4 is telescopically mounted within housing bore 40b for longitudinal movement for striking the cartridge case primer and exploding powder therein. The firing pin is cocked in response to movement of the tool in the downward direction against the workpiece from the breech open position in FIG. 4 to the breech closed position in FIG. 5. A cocking rod 52 is rigidly carried by ram guide member 42 and is locked therein by cross pin 53. As the housing member 40 telescopes downwardly over the ram guide member 42, the upper end of cocking rod 52 engages firing pin pawl 54, normally outwardly biased by firing pin pawl spring 55, so that continued downward movement of tool housing member 40 will cause rod 52 to cock the firing pin 51 against its firing pin spring 56 until the fully cocked position of FIG. 5 is reached. Then, pulling trigger 57, pivotally connected to the housing member 40 at pivot 58 will move the trigger 57 counterclockwise about the pivot against the force of the trigger spring 59, anchored at its left end to housing member 40, so that trigger sear 57a will depress the pawl 54 with which it is aligned and release firing pin 51 so that firing pin spring 56 will drive firing pin 51 downwardly against the primer of the cartridge case 44 to explode the powder charge therein. This same structure is used for firing the cartridge case and driving the ram by the exploding gases therein in all other illustrated forms of the invention.

Means is provided on guide member 42 supporting cartridge case 44 for driving ram 41 from its initial to final position. Here, a breech element 60 in FIG. 4 is screwed into the breech end of guide member 42 and locked in place by a set screw 62 in FIG. 11. The element 60 has a cartridge chamber 60a for receiving cartridge case 44 and a thin-walled cylindrical portion 60b having a bore adapted to convey the exploding gases forwardly from the cartridge chamber 60a. Ram 41 has a rearwardly opening ram bore 41b, with a forward closed end, telescoped over this cylindrical portion 60b with the ram bore 41b generally corresponding in cross section to the periphery of the cylindrical portion 60b to form with the bore of this cylindrical portion 60b a gas chamber 61. This design provides a confined volume for high-pressure burning of the powder. There is a smaller increase in burning volume for a given axial travel of the ram, a more complete burning of the powder, and closer proximity between the powder and the flame than in other designs since the force of the explosion cannot blow the powder away from the flame. This design is especially desirable wherein high breech pressures are encountered and complete burning is desired. Cartridge case 44 is of a crimped design and preferably has no wad. This provides trouble-free operation because no unburned wad material will accumulate in chamber 61 to provide faulty operation. Powder burning is confined within this chamber 61 until shortly before the ram has reached the final position in FIG. 6. The cylindrical portion 60b and ram bore 41b in FIG. 4 each have an axial length nearly equal to the full length of ram travel to provide this confined chamber condition. However, as the ram approaches its final position, bleed-off occurs out chamfer 41c at the trailing end of the ram bore so that the gases expand into the chamber surrounding the cylindrical portion 60b in FIG. 6. However, the gases continue to push the ram forwardly until longitudinal slot 42b in guide member 42 is exposed to permit escape of the propelling gases into slot 42b with a large increase in volume to eliminate further driving thereby. However, the inertia of ram 41 carries it forwardly to its final position against abutment sleeve 46, and the powder charge in case 44 has been chosen large enough for this purpose. Similar structure for the same purpose is shown in the other illustrated forms of the invention. After the ram has been driven to the final position shown in FIG. 6, it should be noted that the fastener retaining ball 48 is now free of the driven fastener 43 so that the tool may be easily pulled off the driven fastener in FIG. 6 because the head 43b thereof has a loose fit in sleeve bore 46b.

Figures 6, 7:
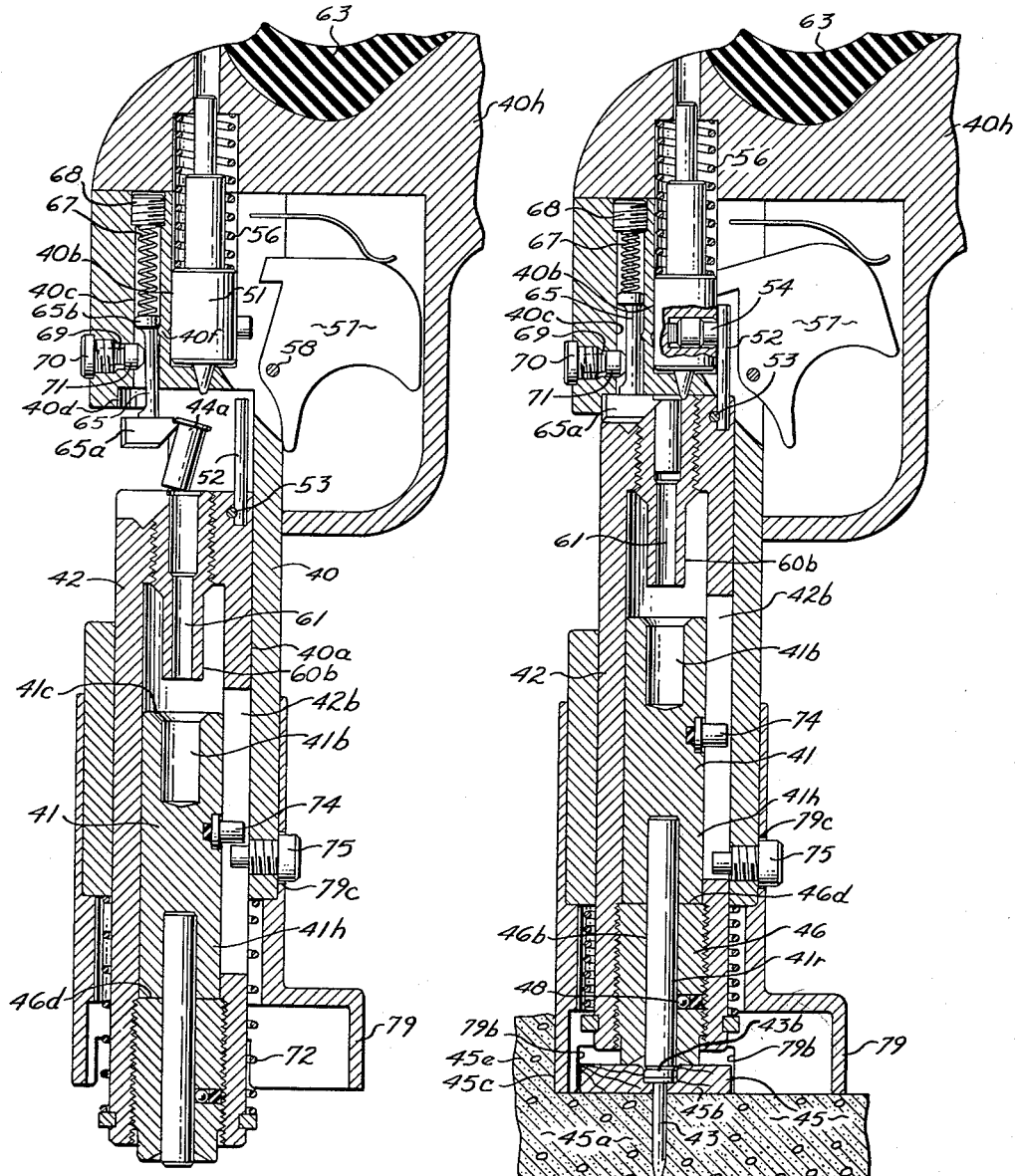
FIG. 6 is a longitudinal sectional view of the tool in its driving and breech closed position but with the firing pin released, the powder charge exploded, and the ram driven to its final position.
FIG. 7 is a longitudianl sectional view of the tool with the breech partially open and the tool being withdrawn from the workpiece.
Figure 8:
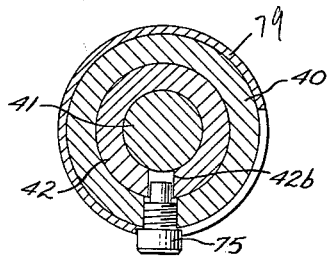
FIG. 8 is a transverse sectional view taken along the line 8—8 of FIG. 4 through the abutment or key carried by the housing member.
Figure 9:
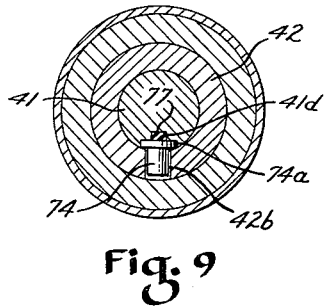
FIG. 9 is a transverse sectional view taken along the line 9—9 of FIG. 4 through the abutment or key carried by the ram.
Figure 10:
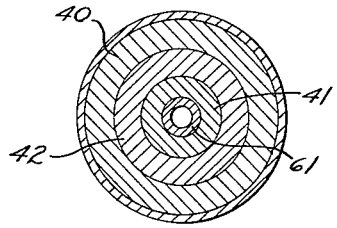
FIG. 10 is a transverse sectional view through the gas chamber taken along the line 10—10 of FIG. 4.
Figure 11:
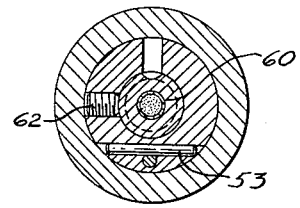
FIG. 11 is a transverse sectional view through the cartridge chamber taken along the line 11—11 of FIG. 4.
Figure 12:
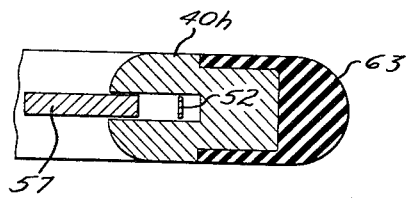
FIG. 12 is a longitudinal sectional view through the trigger and hand grip taken along the line 12—12 of FIG. 1.
Figure 13:
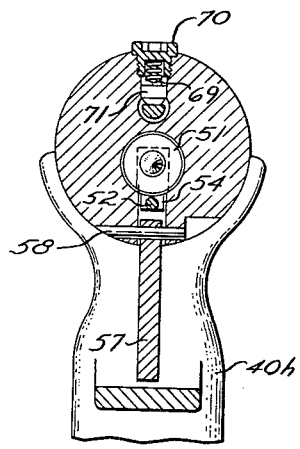
FIG. 13 is a transverse sectional view taken along the line 13—13 of FIG. 5 through the extractor and firing mechanism.

The exhausting gases are generally confined within slot 42b with the tool in the driving position of FIG. 6 although some leakage between the tool parts occurs. This reduces the loudness of the muzzle blast. However, as the tool is withdrawn from the workpiece, the front of slot 42b is exposed to the atmosphere for exhaust. See FIG. 7.

The tool is adequately protected against damage by impact in this final position. Both stop sleeve 46 and ram 41 are designed to minimize breakage. Stop sleeve 46 has an abutment surface 46d in FIG. 6 struck by the head of the ram 41 at the end of its driving travel. It has been found that breakage is substantially reduced if the threads 46a on stop sleeve 46 extend axially up to the plane of abutment surface 46d along the uniform diameter bore of the sleeve type guide member 42. If the thread does not extend up to the end, the impact force must be transmitted axially some distance before it strikes the anchoring thread and breakage will occur across the first thread on the impact side.

The design of ram 41 also tends to reduce breakage. Ram 41 has a head 41h in FIG. 6 and a separate, forwardly protruding, uniform diameter rod 41r secured thereto by any suitable fit, such as a press fit. This type construction minimizes breakage at the junction between the rod and the head. It has been found that a one-piece construction tends to break at this shoulder by the stress concentration formed thereat. The identical or similar construction is shown in all illustrated forms of the invention for the same purpose.

Housing member 40 has a hand grip 40h extending laterally therefrom by which the tool operator is able to grasp the tool and press the muzzle against the workpiece during driving. Hand grip 40h has a pad 63 of rubberlike material adhesively or otherwise secured to the hand grip 40h on the side remote from the tool muzzle to absorb tool recoil during power driving.

The tool is provided with a cartridge case extractor 65 having a head 65a at one end for cartridge case head engagement. This extractor is operatively connected to the housing member 40 for lateral movement to slide over a cartridge case head shoulder 44a during movement of the tool toward the breech closed position in the manner shown in FIG. 4a by the camming surface on the forward side of the head, for backup in the breech closed position to prevent lateral blow-out during tool firing (see FIG. 5), and for resisting lateral movement in the outward direction during movement toward the breech open position so that the extractor will properly extract the cartridge without slipping over the cartridge case head shoulder 44a. Housing member 40 serves as a breech closure member while guide member 42 serves as a cartridge case carrying member. This operative connection includes in FIG. 7 an axially extending bore 40c in the housing member 40 within which extractor 65 is loosely mounted for lateral movement of head 65a and is telescopically mounted for axial movement relative to the housing member 40 to provide both lateral and longitudinal movement of the extractor head relative thereto. Means is provided for biasing the extractor 65 axially in bore 40c from a head retracted position in FIG. 5 to a head advanced position in FIG. 4 toward the ram guide member 42 in response to tool movement from the breech closed to breech open positions. This takes the form of a compression spring 67 located between the extractor 65 and a screw plug 69 screwed into the housing member 40. Means is also provided for biasing the extractor head 65a laterally inwardly from an outward to an inward position for cartridge case head shoulder engagement during movement to the breech closed position. It takes the form of a spring 69 biasing a shoe 71 inwardly against extractor 65 with the spring backed up by a stop screw 70 screwed into the housing member 40 so as to pivot extractor 65 about shoulder 65b on bore surface 40c. Housing member 40 has a stop shoulder 40d serving as a lateral back-up stop for blocking lateral outward movement of the extractor head 65a in the breech closed position of FIG. 5 for preventing lateral blow-out.

Figure 4A:
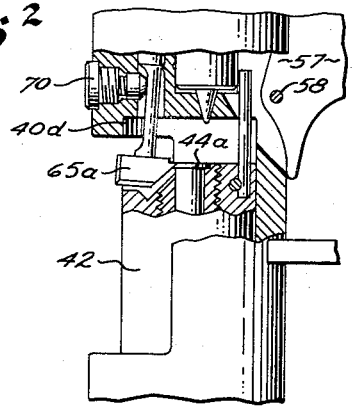
FIG. 4a is an enlarged view of the extractor sliding over the cartridge case head as the tool moves from the breech open position in FIG. 4 to the breech closed position in FIG. 5.

The operation of this extractor should now be readily apparent. As the tool members move from the breech open toward the breech closed position, extractor head 65a in FIG. 4a is forwardly of and axially out of blocking alignment with the stop shoulder 40d so that its inclined forward face will cam over the cartridge case head shoulder 44a as it moves from its laterally inward to its laterally outward position against the bias of spring 69. With the tool in the breech closed position of FIG. 5, stop shoulder 40d is in blocking alignment with head 65a to prevent lateral blow-out of the extractor during tool firing. As the tool is moved from the breech closed toward the breech open position, spring 67 keeps extractor head 65a against guide member 42 until shoulder 65b hits bump stop 40f in bore 40c. This prevents further extractor travel beyond the outward position, and both springs 67 and 69 pivot extractor 65 about this pivot to swing and bias head 65a more firmly to its inward position. Since the cartridge case 44 is pulled on only one side and is pushed inwardly by the extractor head 65a, the breech opening movement will tend to spin the empty cartridge case 44 out of the open port of the tool.

If an unfired cartridge case 44 should be extracted and if its crimp should accidentally guide it back into the chamber, no difficulty will occur because head 65a will slide over it properly as the tool is moved to breech closed position as in FIG. 4a.

Ram return means is provided for automatically returning ram 41 from its final position in FIG. 6 back to its initial position in FIG. 5 and for establishing a predetermined size to gas chamber 61 to control the ram driving force during the next cycle of tool operation. This ram 41 is automatically returned in response to relative movement between members 40 and 42 when the tool is moved from the driving position in FIG. 6 to the withdrawn position with the parts shown in this position in FIG. 4. This ram return means includes a plug type abutment or key 74 carried by the ram in its hole 41d and a screw type abutment or key 75 carried by the housing member 40 in its threaded hole 40e with both traveling in guide member slot 42b and being axially located for abutting coaction. The tool also includes a muzzle spring 72 of the compression type to serve as a resilient means for biasing guide member 42 relative to the housing member 40 in the direction of fastener drive since the spring 72 in FIG. 4 is located between the muzzle end of the housing member 40 and a snap ring 76 mounted in a groove on the muzzle end of guide member 42. With the tool in the withdrawn position and the tool component parts in the FIG. 4 position, the fastener discharge end (the lower end) of guide member 42 projects downwardly beyond the discharge end of the housing member 40. The operation of this structure to provide automatic ram return should now be readily apparent. As the tool is withdrawn from the workpiece and the component parts move from the FIG. 6 to the FIG. 4 position, abutment screw 75 on housing member 40 will engage the abutment plug 74 on ram 41 as it moves upwardly so as to pull the ram 41 in the upward direction from its final to initial position. Of course, muzzle spring 72 biases the members apart so that the FIG. 4 position will be automatically assumed as the tool is withdrawn from the workpiece. After the tool has been loaded for the next fastener driving operation and is pressed against the workpiece from the withdrawn position in FIG. 4 to the driving position in FIG. 5, the travel of guide member 42 is arrested by the workpiece so that housing member 40 may continue its downward movement relative thereto during tool travel into the breech closed position to move the abutment screw 75 on the housing member 40 toward the workpiece a distance greater than the distance between the initial and final positions of the ram 41 to provide clearance for ram travel. Compare FIGS. 5 and 6 of the drawings to see this clearance. It has been found desirable to use these abutments 74 and 75 to automatically retract ram 41 because other automatic return constructions have a very short service life. If the ram is driven against a spring or other resilient member with the thought that the resiliency thereof will automatically return the ram from its final to its initial position, it will be found in practice that the spring or resilient member will not stand up under the shock and impact imposed thereon. Here, abutments 74 and 75 do not take the impact during stopping of the ram.

Since the tool is illustrated as driving the ram downwardly, it is desirable that the ram 41 be releasably retained in its initial position shown in FIG. 5 to prevent downward free travel thereof. Here, a rubber pad 77, located in mounting bore 41d for the ram abutment 74 resiliently pushes in FIG. 9 head 74a of abutment or key 74 outwardly toward and against the bore of ram guide member 42 at the zone of slot 42b for releasably retaining ram 41 in any given position since head 74a is wider than slot 42b.

This single slot 42b in the guide member provides a plurality of functions. First, it is located so that ram 41 in its final position in FIG. 6 will expose the slot to permit the gases from gas chamber 61 to be exhausted therein. Second, abutments 74 and 75, travelling in this common slot, prevent relative rotation between ram 41, guide member 42 and housing member 40. Third, prevention of relative rotation between guide member 42 and housing member 40 assures that cocking rod 52 will always properly align with the firing pin pawl 54 to provide the proper firing pin cocking action.

The tool has been provided with a shield 79 especially adapted to permit the tool to be used for securing carpet attaching strips to the floor of a room closely adjacent the room wall. The carpet may be laid on and then secured to the strip by prongs extending upwardly from the strip. Here, workpiece 45 includes the cement floor 45a of the room and the carpet attaching strip 45b to be secured thereto closely adjacent wall 45c. The shield has two series of grooves 79a and 79b in its workpiece engagement face arranged at right angles with either able to coact with the ridge formed by the strip 45b while maintaining the proper spacing of the strip from wall 45c. The tool shield is so constructed that the tool may be turned to the most convenient angle for usage. Shield 79 is rotatably mounted by its cylindrical bore on a cylindrical surface of the housing 40 coaxially with the fastener 43 for 90 degree arcuate movement. Here, an arcuate slot 79c on the shield coacts with the head of screw 75 carried by the housing member. The slot has sufficient length so that the shield 79 can swing 90 degrees about the longitudinal axis of fastener drive with respect to tool handle 40h so that the tool can always be used in its most convenient position. Generally, this position will be with the tool handle 40h extending at right angles away from the wall surface 45c. When it is desired to drive a fastener close to a corner of the room, it may be desirable to swing the shield 90 degrees from its solid line to dot-dash line position in FIG. 3 to reach in closer to the corner; this is the advantage of having two sets of grooves 79a and 79b in the workpiece engagement face of the shield. Also, when the tool is used close to a corner, it may be easier to use the tool if the handle 40h thereof extends out at an angle of approximately 45 degrees with respect to the two corner adjacent walls so that there is adequate room for the operator's hands on the tool; this intermediate position is easily obtained by having the screw head 75 located intermediate the ends of the slot 79c.

The modifications shown in FIGS. 14–35 are slight or extensive modifications of the basic tool in FIGS. 1–13, and only the portion of the tool so modified is illustrated so that the mode of operation and advantages are basically the same unless described again in detail. FIG. 34 illustrates a complete tool using some of these modifications.

Figure 14:
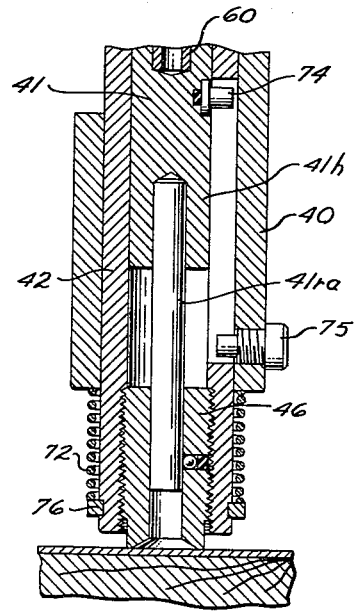
FIG. 14 is a longitudinal sectional view of the muzzle end of the tool in the FIG. 4 position but having the ram equipped with a longer drive rod to provide a punching operation instead of a fastener driving operation.
Figure 15:
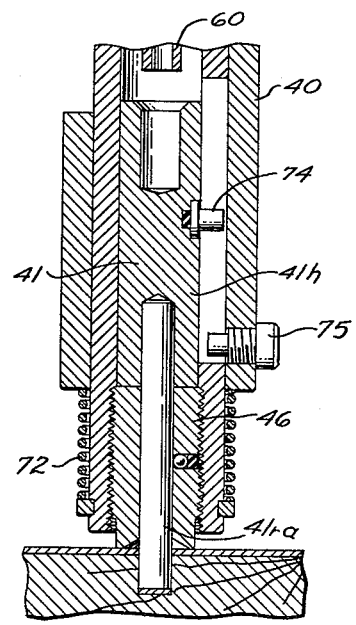
FIG. 15 is a longitudinal sectional view, similar to FIG. 14, but with the rod in the final position after punching has been performed.
Figure 16:
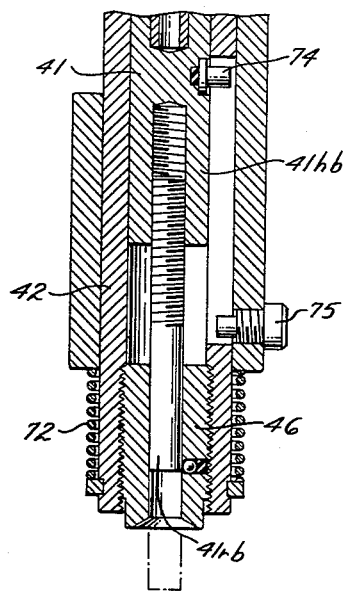
FIG. 16 is a longitudinal sectional view of a tool modification having a screw thread connection between the head and rod of the driving ram.

FIGS. 14, 15 and 16 illustrate modifications of the tool. A longer rod 41ra in FIGS. 14 and 15 has been secured to ram head 41h to form the ram so as to permit the tools to be used for punching instead of fastener driving. In FIG. 16, a rod 41rb has been connected to a ram head 41hb by a screw thread connection. In both forms, the protrusion of the rod from the head in the fully driven position may be easily varied by interchanging rods of different lengths in FIGS. 14 and 15 or screwing the threaded connection in FIG. 16. (Compare FIGS. 16, 34 and 35.) Also, the depth of punching may be varied. Since each form has a ram having its driving rod separate from its driving head, this separate construction minimizes the chance of breakage between the rod and head.

Figure 17:
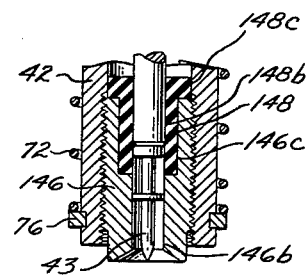
FIG. 17 is a longitudinal sectional view of an alternate form of fastener retainer which may be used in the FIG. 4 structure at the tool muzzle for retaining the fastener against dropout.

FIG. 17 discloses a modified form of fastener retainer usable in the tool in FIGS. 1–13. Here, a rubber-like sleeve or grommet 148 is anchored in a counterbore of fastener supporting bore 146b of modified sleeve 146 with the fastener retaining bore 148b of this sleeve slightly smaller in diameter than the fastener supporting bore 146b to resiliently hold the fastener 43 therein to prevent fall-out. However, after the fastener has been driven, sleeve 148 is free of the driven fastener so that the tool can be easily pulled off the driven fastener. Also, the upper end 148c of the sleeve projects beyond the end of the sleeve 146 toward the ram to serve as a buffer stop for the ram hand 41h in its final position shown in FIG. 15. Hence, sleeve 148, made of rubber-like material, provides three functions by retaining the fastener 43 in the initial position of the ram, by being free of the fastener after it has been driven so that the tool will easily pull off the driven fastener, and by providing a buffer stop for ram head 41h.

FIG. 18 discloses a modification in the ram construction. In FIG. 4, the close fit between the periphery of cylindrical portion 60b and ram bore 41b prevents exhaust of the gases from gas chamber 61 until these surfaces leave contact immediately prior to the ram travel to the FIG. 6 position. Sometimes controlled gas bleed-off during ram travel is desirable. In FIG. 18, a modified form of ram head 141h is provided with a ram bore 141b generally corresponding, in cross section to the periphery of the cylindrical portion 60b but being tapered and enlarging in its trailing direction for providing gradually increased bleed-off during ram travel.

FIGS. 19 to 33 disclose different forms of automatic ram return means for returning the ram from its final to initial position and for establishing a predetermined gas chamber size to control the ram driving force. However, each includes gas chamber adjusting means for adjusting the size of the gas chamber in its initial position for adjusting the driving force of the ram to provide variable power. In each, the coacting abutments or keys 74 and 75 respectively carried by the ram and housing member are used to return the ram to its initial position. However, two different types of adjustment for chamber size are provided. First, a stop is provided in FIGS. 19–21 and 24–33 to limit the travel of the ram guide member relative to the tool housing member toward the breech open position so that a different spacing can be obtained between cartridge case 44 and the ram to change the size of the gas chamber in the initial position of the ram. Hence, the initial position of the ram will be changed slightly with this adjustment. This stop action is obtained in FIGS. 1–13, 22 and 23 by having the ram firmly abut against breech element 60. For example, see FIG. 4. Second, the ram is always returned to the same initial position in FIGS. 22 and 23 but the gas chamber size can be adjusted to the volume desired.

In FIG. 19, structure is disclosed for ram return and gas chamber volume adjustment. A modified form of housing member 140 is provided with a plurality, here shown as two, of axially spaced apart mounting holes 140e for mounting the abutment screw 75 in different positions. Stop screw 180 is carried by a modified form of guide member 142 so that it will bear against stop surface 140j on housing member 140 under the bias of the muzzle spring 72. FIG. 19 illustrates a fairly large initial chamber volume, but it should be readily apparent that placement of the abutment screw 75 in the upper hole 140e will cause the ram 41 to be returned closer to the breech element 60 to reduce the size of the initial gas chamber.

FIGS. 20 and 21 illustrate another form of ram return and gas chamber size adjustment construction. Here, adjustment is provided in the stop for limiting the travel of the ram guide member relative to the tool housing member toward the breech open position. A modified form of ram guide member 242 is mounted for endwise reciprocation in a modified form of housing member 240. An adjustable ring 281 is rotatably mounted on guide member 242 and has a set screw 280 for locking it in any angular adjustment thereon. The set screw 280 acts as a stop to coact with a stop surface formed by any one of the notches 240j on the modified form of housing member 240. Since these notches 240j have different longitudinal spacings, each determines a different gas chamber size. It should be apparent that even though abutment screw 75 will always return the ram 41 to the same initial position with respect to the housing member 240, the size of the gas chamber will be determined by the relative position between guide member 242 and housing member 240 when the stop screw 280 engages the stop surface of one of the notches 240j.

FIGS. 24–28 disclose another construction for ram return and chamber size adjustment. Here, a modified form of housing member is provided and is composed of two axially adjustable parts 340r and 340s connected together by screw threads to permit the axial adjustment. The length of the axial distance between stop surface 340j and abutment screws 75 may be changed. Lock screw 383 may be tightened to secure the housing parts in any given adjusted position. Of course, stop screw 380 coacts with the housing stop surface 340j to limit the travel of guide member 342 to the breech open position by the muzzle spring 72. Since the abutment screw 75 must remain in longitudinal slot 342b of the guide member, rotational adjustment of housing part 340s must still permit this to happen. Change in longitudinal spacing of abutment screws 75 may be obtained by rotating the housing part 340s a portion of a turn and then placing the screw 75 in another one of the threaded holes 340e arranged generally along a helical or any other suitable longitudinally displaced path. However, this construction will work satisfactorily under some conditions with only one hole 340e because a complete rotation of part 340s will cause it to move axially with respect to housing part 340r one pitch length of the connecting threads. Then, the abutment screw 75 will have been displaced by this amount in one rotation and the screw will still be in alignment with guide member slot 342b for proper operation.

In FIGS. 22 and 23, the ram is always returned to the same initial position but a screw plug is provided to adjust the gas chamber volume size.

IN FIG. 22, an adjusting screw plug 384 is screwed into ram 381 and extends into the gas chamber in the initial position of the ram, as illustrated, to permit adjustment of the size thereof by insertion of a screwdriver throught the cartridge chamber of breech element 60 to rotate the plug 384 by the screwdriver slot 384a in its head. The plug 384 is of smaller transverse size than and located coaxially with the bore of cylindrical portion 60b so that the plug can be used for adjusting the gas chamber volume while still providing a gas chamber of minimum volume for confined burning. The modified form of ram 341 also has a bore 341b telescoped over the cylindrical portion 60b of the breech element.

In FIG. 23, an adjusting screw plug 484 is screwed into a bore in a modified ram 441 and extends into a bore or modified form of breech element 460 in the initial position, as illustrated, to permit adjustment of the gas chamber size. Screw plug 484 also has a screwdriver slot in its head to permit this adjustment. This plug is of smaller transverse size and located coaxially with the bore of the breech element 460 to minimize gas chamber volume and confine burning while permitting power adjustment. Both ram 441 and breech element 460 have transversely extending flat faces, abutting in the initial position, with these faces extending the full distance from their chamber forming bores outwardly to the surrounding guide member 42.

FIGS. 29-33 illustrate another form of tool construction especially adapted for handling long fasteners, with their length being such that a tool of one of the previously described constructions accommodating the long fastener must of necessity be much longer and therefore unwieldy. Here, a manually actuatable, pump-type sleeve 586 surrounds housing member 540 and is operatively connected thereto for axial relative movement to provide the balance of the ram return movement after expansion of muzzle spring 572.

Means is provided operatively connecting sleeve 586 to ram guide member 542 for manually moving the latter axially by the sleeve between end positions, such as returning the ram to its initial position shown in FIG. 31. This takes the form of a snap ring 587 secured in a recess in the bore of said sleeve, muzzle spring 572 and a snap ring 576 secured in a recess on the periphery of ram guide member 542. A tool shield 579 is secured to sleeve 586 by one or more screws 579a or other suitable fastening means so that spring 572 is kept under compression.

Means is also provided for controlling the length of axial travel of the actuating sleeve 586 relative to the housing member 540. This takes the form of a stop screw 580 secured to housing member 540 and having a head located in one of the slots 586a in FIG. 32 in sleeve 586. As will hereinafter appear, the choice of slots determines the gas chamber size in the initial ram position, the position of parts here shown, which in turn controls the driving power.

The mode of operation should now be apparent. After loading, the tool is moved from the breech open position in FIG. 31 toward the breech closed position by telescoping sleeve 586 rearwardly over the housing member 540 until the stop screw 580 abuts against the front end of one of the slot 586a, as shown in FIGS. 29 and 30. Then, the parts assume the position shown in FIG. 29 with the breech not quite closed. The engagement of the shield 579 with the snap ring 576 has moved the ram guide member 542 from the FIG. 31 to the FIG. 29 position. As the tool ih pressed down against the workpiece, it assumes the driving position shown in FIG. 30 with the breech fully closed since the guide member 542 and shield 579 attempt to assume a flush relationship and compress spring 572 during this process. Then, the tool is fired with abutment 74 moving from the solid line to the dot-dash line position in FIG. 30. As the tool is withdrawn from the workpiece after fastener driving, spring 572 will move the tool parts to the FIG. 29 position, but, of course, ram head 41h is still in its fully driven position and extractor head 65a will be extracting cartridge case 44 at this time instead of being in the position illustrated. Telescopic movement, here manually effected, of the sleeve 586 forwardly over the housing member 540 during or after tool withdrawal movement will cause the abutments 74 and 575 to engage so as to move the ram back to the initial position shown in FIG. 31.

The amount of driving power may be adjusted. Since each slot 586a in FIG. 32 is of a different length, the selection of a particular slot for coaction with stop screw 580 will determine the initial position of the ram and hence the size of the gas chamber so that variation in size thereof from the FIG. 31 position may be obtained. As will be readily understood, the smaller the gas chamber, the greater the power. FIG. 31 discloses the minimum gas chamber size with screw 580 in the longest slot (at the extreme left in FIG. 32). It should be readily apparent that placement of the screw 580 in one of the shorter slots 586a in FIG. 32 will prevent abutment 575 from returning abutment 74 fully to the FIG. 31 position so that the size of the initial gas chamber will be larger.

FIGS. 34 and 35 illustrate a composite tool wherein the basic tool of FIGS. 1-13 has been modified to include several of the modifications mentioned heretofore. This tool has rod 641r and head 641h corresponding respectively with rod 41rb and 41 hb in FIG. 16; stop sleeve 646 and rubber-like fastener retainer sleeve 648 corresponding respectively to sleeves 146 and 148 in FIG. 17; stop and set screw 680, stop surface notches 640j and adjustable ring 681 corresponding respectively with screw 280, notches 240j and ring 281 in FIGS. 20 and 21; housing member parts 640r and 640s, mounting holes 640e and lock screw 683 corresponding respectively with parts 340r and 340s, mounting holes 340e and lock screw 383 in FIG. 24; and adjustable screw plug 684 corresponding with plug 384 in FIG. 22. Hence, the gas chamber size in the initial position may be adjusted by turning plug 684, moving abutment screw 75 axially relative to stop surfaces 640j by turning part 640s relative to part 640r, or by controlling the length of travel of guide member 642 relative to the housing part 640r by means of set screw 680 and adjustable ring 681. This construction provides a greater range of adjustment, a finer adjustment and a tool better able to be adjusted to suit the conditions of powder burning encountered than any of the previously described tools.

Also, the tool may be used for either fastener driving or punching. FIG. 35 shows the tool used for punching with the ram in its final position and compressing the flange-like head of sleeve 648.

Various changes in details and arrangement of parts can be made by one skilled in the art without departing from the spirit of this invention or the scope of the appended claims.

We claim:
1. In a powder cartridge actuated tool, a breech closure member, a cartridge case carrying member, means operatively connecting said members for axial relative movement in one direction to a breech closed position and in an opposite direction to a breech open position, an extractor having a head at one end engageable outwardly of the case with both said members in said closed position, means operatively connecting said extractor at its opposite end to said closure member for limited outward lateral movement of said extractor to allow said head to slide over a rim of the cartridge case head during relative movement in said one direction while urging said head laterally inwardly sufficiently to resist lateral movement of said head outwardly during relative movement in said opposite direction so that said head will remain engaging a front shoulder of said rim for proper extraction during movement in said opposite direction and back up means for blocking lateral outward movement of said extractor in said breech closed position sufficiently to prevent lateral blow-out of said case adjacent said rim during tool firing.

2. In a powder cartridge actuated tool, a breech closure member, a cartridge case carrying member, means operatively connecting said members for axial relative movement in one direction to a breech closed position and in an opposite direction to a breech open position, an extractor having a head at one end engageable outwardly of the case with both said members in said closed position, means operatively connecting said extractor at its opposite end to said closure member for providing both limited longitudinal and lateral movement of said extractor relative to said breech closure member to allow said head to slide over a rim of the cartridge case head during relative movement in said one direction while urging said head laterally inwardly sufficiently to resist lateral movement of said head outwardly during relative movement in said opposite direction so that said head will remain engaging a front shoulder of said rim for proper extraction during movement in said opposite direction, and abuttable back-up means on said head and closure member for blocking lateral outward movement of said extractor head in said breech closed position to prevent lateral blow-out of the case adjacent the rim during tool firing.

3. In the combination set forth in claim 2, wherein the back-up means includes a lateral axially extending shoulder providing a stop on the closure member for blocking lateral outward movement of the head of the extractor in the breech closed position, resilient means responsive to member movement in the one and opposite directions for respective extractor movement axially into and out of blocking alignment with said stop.

4. In the combination set forth in claim 2, wherein the extractor and closure member connecting means includes means for biasing the head of the extractor laterally in the inward direction.

5. In the combination set forth in claim 3, wherein the head of the extractor has a shoulder radially facing and engageable with the stop shoulder of the closure member; and wherein the extractor and closure member connecting means includes an axially extending bore in said closure member within which said extractor is loosely mounted for lateral movement of said head radially and is telescopically mounted for axial movement relative to said closure member, means biasing said extractor axially in said bore from a head retracted position at which said shoulders are in engagement to a head extended position toward said cartridge case carrying member in response to member movement from said closed to open position, means for biasing said extractor head laterally inwardly from an outward to an inward position for cartridge case head shoulder engagement during movement to and from said breech closed position, and a stop in said bore preventing extractor travel beyond said head extended position and coacting with both resilient means to position said head in said inward position, said closure member stop shoulder not being engageable with said extractor head shoulder in head extended position.

References Cited by the Examiner
UNITED STATES PATENTS

| 1,041,410 | 10/12 | Benet et al. | 42—25 |
| 1,208,892 | 12/16 | Barnes | 42—25 |
| 1,317,587 | 9/19 | Mercie | 42—25 |

GRANVILLE Y. CUSTER, JR., *Primary Examiner.*